United States Patent [19]

Fearnside

[11] 4,055,848
[45] Oct. 25, 1977

[54] SIGNAL PROCESSING FOR OFF-AIR VIDEO RECORDER

[75] Inventor: William T. Fearnside, Fishers, N.Y.
[73] Assignee: Eastman Kodak Company, Rochester, N.Y.
[21] Appl. No.: 605,100
[22] Filed: Aug. 15, 1975
[51] Int. Cl.² .............................................. H04N 5/76
[52] U.S. Cl. ......................................... 358/8; 358/4
[58] Field of Search ....................................... 358/4, 8

[56]  References Cited

U.S. PATENT DOCUMENTS

| | | | |
|---|---|---|---|
| 3,729,579 | 4/1973 | deBoer | 358/4 |
| 3,764,739 | 10/1973 | Faroudja | 358/4 |
| 3,775,554 | 11/1973 | Hjortzberg | 358/4 X |
| 3,812,523 | 5/1974 | Narahara | 358/4 |
| 3,872,498 | 3/1975 | Pritchard | 358/4 X |

Primary Examiner—Robert L. Griffin
Assistant Examiner—Mitchell Saffian
Attorney, Agent, or Firm—Robert F. Cody

[57]  ABSTRACT

An off-the-air color video recorder employs frequency interleaved chroma and luminance signal information for purposes of bandwidth compression. During playback, a shooting gallery picture defect characterized by motion along horizontal scene edges was noted. Analysis indicated the problem source to be the bleeding of chroma into the playback luminance channel. To avoid this problem, the chroma signal information, prior to recording, has its vertical resolution reduced, e.g., by line-by-line averaging of chroma.

10 Claims, 9 Drawing Figures

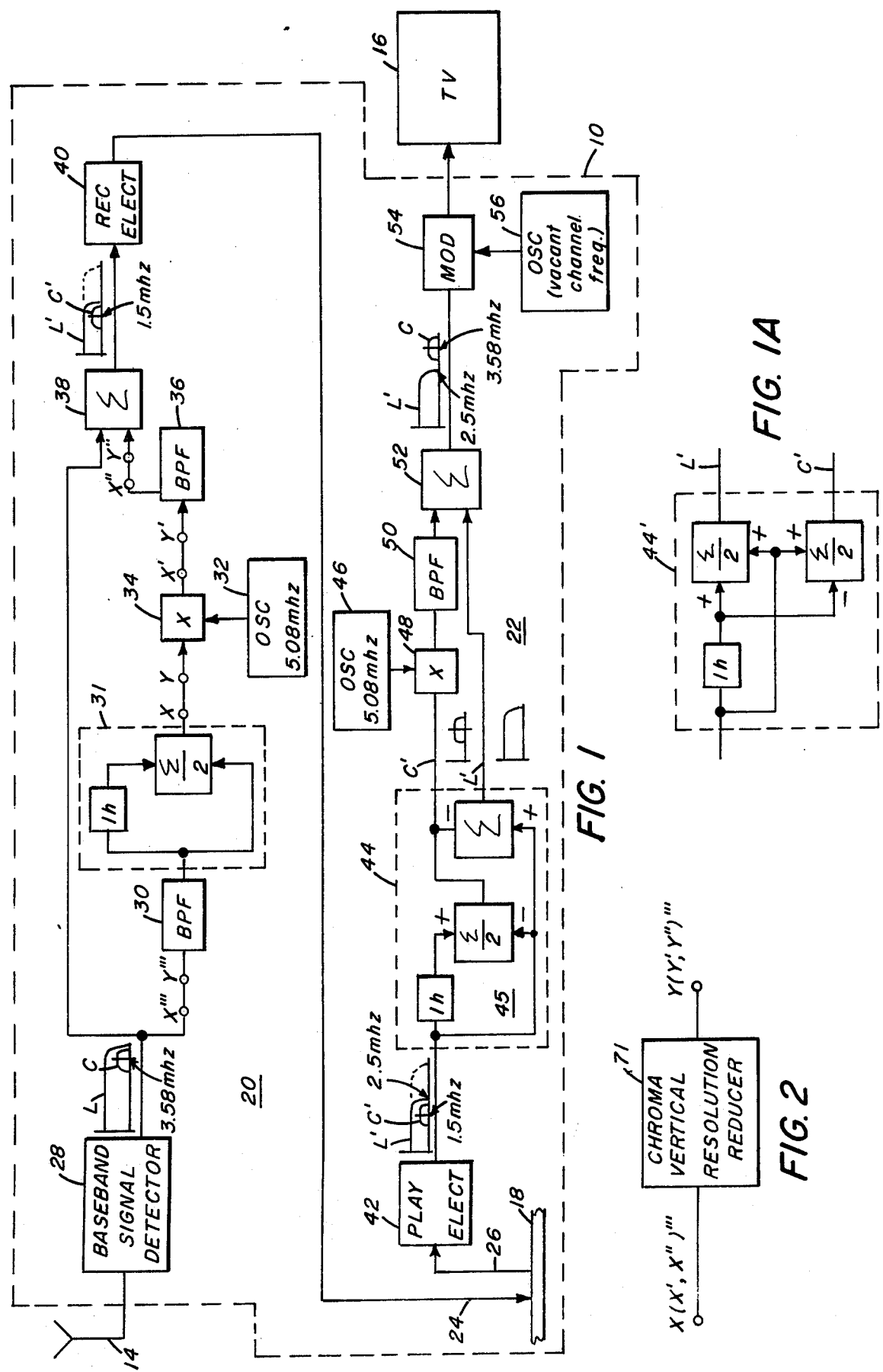

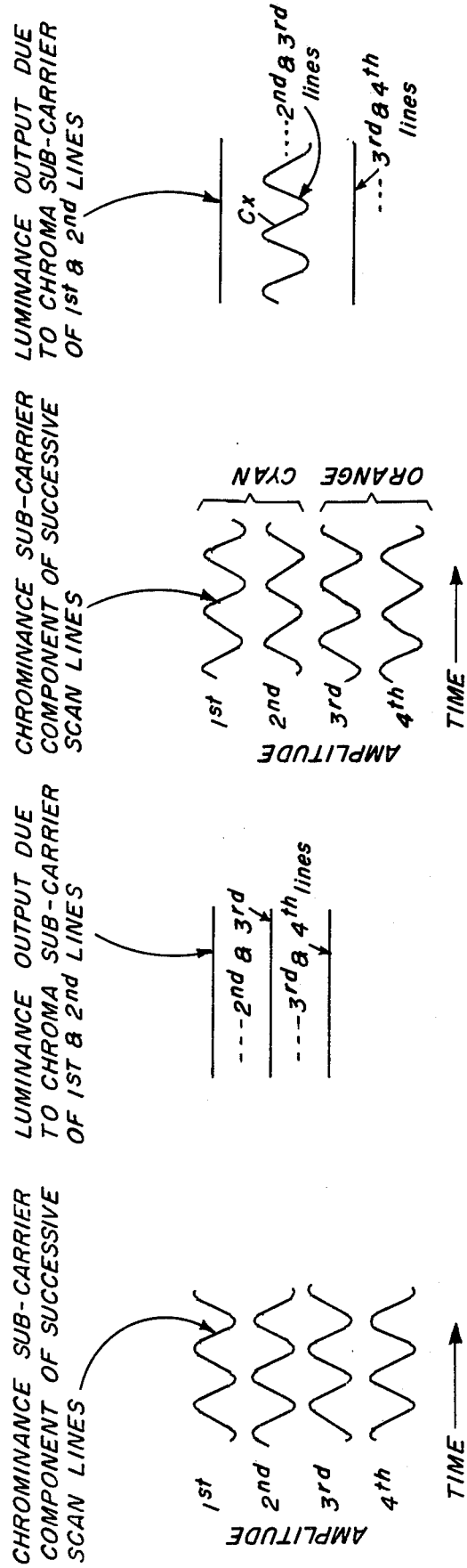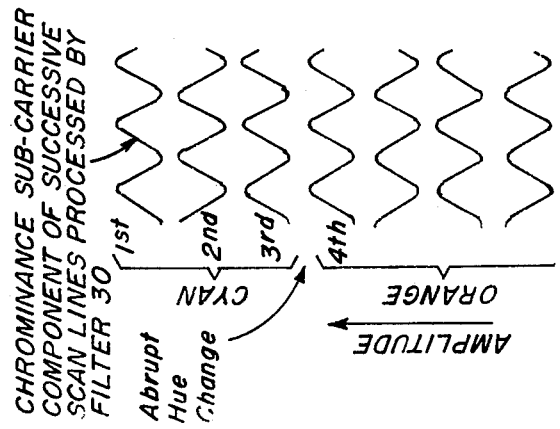

SIGNAL PROCESSING FOR OFF-AIR VIDEO RECORDER

CROSS-REFERENCE TO RELATED APPLICATIONS

The following applications are related to each other: Ser. Nos. 605,095; now U.S. Pat. No. 4,003,079; 605,096 and 605,101, both now abandoned.

BACKGROUND OF THE INVENTION

Field of the Invention

This invention relates in general to signal processing and, in particular, to such signal processing as may be employed in connection with an "off-the-air" color video recorder. While not restricted to the recording of signal information on magnetic tape, the invention is cast in such an environment to facilitate its description.

Description Relative to the Prior Art

The relatively short history of video recording, whether off-the-air or otherwise, would indicate a trend toward complexity, and away from simplicity. Unlike the audio bandwidth — which may easily be recorded directly, i.e., without a carrier frequency — the video bandwidth presents a severe challenge to a recording system. The video spectrum has a range of about 17 octaves (versus about 10 for sound) and extends to about 4.5 MHz (versus only about 15,000 Hz for sound). Attendantly, the recording of video information has primarily been via modulation techniques, whereby the number of octaves to be recorded can be appreciably reduced. FM recording, in particular, has been the vehicle by which most video recording has been implemented, a typical FM carrier for the baseband video being, say, 12 MHz. Considering that both sidebands are recorded (which is not always the case), this would suggest that the bandpass requirements of such a system would be from 7.5 MHz to 16 MHz, which is only about one octave.

While the octave-reducing quality of FM recording is desirable, it is achieved not without cost, viz., that of system complexity. To replay, say, a 16 MHz signal which is recorded on magnetic tape means that either the head-gap used for playback be extremely small, or that the head-to-tape speed be extremely fast. Typically, with head gaps of 50 microinches, head-to-tape speed has had to be about 1500 inches per second (ips). In light of such high head-to-tape speeds, the art has resorted to the use of so-called rotary systems (transverse; helical), whereby tape transport speed may be kept reasonably slow. Notwithstanding the trend toward modulation of the video signal prior to recording, the head-to-tape speed for a given head gap may be reduced appreciably if the video signal is recorded directly, i.e., without a carrier frequency. Thus, direct recording continues to hold interest for many in the video recording field provided, of course, that the number of recorded octaves can be reduced sufficiently and without adversely affecting the quality of the images which result from such recording.

As indicated above, the invention is concerned with "off-the-air" recording of video signal information, typically an NTSC (or PAL) signal: The NTSC signal, as is known, contains luminance signal information from DC up to about 4 MHz, and that color signal information (chroma) is interleaved with the luminance signal information at the upper end of the luminance spectrum. Since the acuity of the eye is incapable of resolving, under normal viewing conditions, luminance detail corresponding to luminance signals above about 3 MHz, television manufacturers have, for the sake of economy, conventionally bandlimited luminance channels to somewhere between 2 to 3 MHz, thereby avoiding the problem of having to comb luminance signal information out of the interleaved chroma/luminance part of the NTSC spectrum. Such a practice poses the suggestion that bandwidth compression for video recording purposes be implemented by interleaving the chroma information with the luminance information below about 3 MHz provided, of course, that the interleaved chroma and luminance information can be comb-filtered apart during playback. Given the relatively simple task of interleaving laboratory-produced chroma and luminance, this general approach has already been implemented. See, for example, SID 1975 Digest, pages 14 and 15 which digests part of the apparatus fully disclosed in U.S. Pat. No. 3,872,498 to Pritchard, and which teaches that the spread of the chroma and luminance sidebands around multiples of the video scanning frequency may be reduced, by comb-filtering both chroma and luminance prior to signal interleaving, to avoid interaction between the luminance and chroma information. Such a practice may be likened to "sharpening the teeth of two overlaid combs, the respective teeth of which are almost aligned".

Off-the-air recording, on the other hand, is by no means a laboratory setup, since there is no control over the source of the video signal: The NTSC signal is customized, standardized, and designed not for a video recorder, but rather for reception and processing by a television receiver.

FIG. 1, which is described in detail below, discloses an off-the-air video tape recording system of the direct recording type in which the NTSC signal is detected; the chroma information (0.5 MHz bandwidth) removed from the detected signal; and then down-converted from its conventional subcarrier frequency (3.58 HMz) so as to interleave with luminance information bandlimited to about 2.5 MHz. During playback, the chroma and luminance information are combed apart; the chroma up-converted to 3.58 MHz; and the 0 to 2.5 MHz luminance information, and up-converted chroma centered at 3.58 MHz ($\pm$ 0.5 MHz), which together comprise a modified NTSC signal, placed on a carrier for relay through a vacant channel of a television receiver.

Visual examination of the television picture, produced using the setup of FIG. 1, indicated a fairly acceptable picture, but for certain liveliness (not Moire) appearing within the picture: The source of such lively artifacts thus had to be identified so that appropriate measures could be taken to remove the problem source. Otherwise, off-the-air recording of interleaved luminance/chroma, derived from an NTSC signal, would not be practical in a commercial sense. At first blush, it had appeared that any one, or combination, of the components of FIG. 1 could be the source of the above-identified artifacts: The antenna system could have been bad, the tape could have been noisy, or any modulator, or oscillator, or amplifier, etc., could have been working improperly, e.g., non-linearly.

Rather than one of the more obvious sources of the picture liveliness problem, it was found — as disclosed in copending U.S. application Ser. No. 605,101 — that a fundamental characteristic of the NTSC signal had to be taken into consideration if the direct recording of interleaved chroma and luminance signal information were to be effective, viz., while it is true that the power contained in luminance information at around 3.58 MHz is quite low, it is nevertheless not nonexistent. Any attempt to down-convert chroma at 3.58 MHz, as indicated in connection with FIG. 1, resulted in the simultaneous down-conversion of low power luminance signal information — and it was the down-converted luminance signal information which, when it beat against the lower frequency luminance components, caused the picture liveliness which was noted. Accordingly, as indicated in copending Application Ser. No. 605,101, the off-the-air received NTSC-type signal was pre-combed of residual high frequency luminance information prior to its being down-converted, thereby avoiding the above-noted beating of high and low frequency luminance components; and resulting, during playback, in a television picture in which picture liveliness was minimized.

While picture liveliness was minimized by the teaching of Application Ser. No. 605,101, the television picture, however, still left something to be desired: Along horizontal edges within the television picture, a moving picture defect, somewhat akin to what one might experience while looking at a "shooting galery", was noted. How, then, to determine the source of the shooting gallery effect? Again, the more obvious potential source (antenna, amplifiers modulators, etc) of the shooting gallery effect were found to be operating properly.

By analysis, it was determined that the source of the shooting gallery effect was the bleeding — at the point within the FIG. 1 apparatus where the interleaved chroma and luminance are combed apart during playback — of chroma information into the luminance channel; and that such bleeding of chroma into the luminance channel resulted from vertical variations in the hue of the recorded scene. Why vertical hue variations within a scene should cause the shooting gallery effect will be discussed below in connection with FIGS. 3 and 4; and how the invention in particular serves to eliminate such effect will be discussed later, in connection with FIGS. 5 and 6.

SUMMARY OF THE INVENTION

Having identified the source of the shooting gallery effect during playback of a video recording system of the type employing interleaved chroma and luminance for bandwidth compression purposes, the invention proposes to nullify the effect of scene vertical hue variations by the inclusion in the apparatus of FIG. 1 of a circuit that is effective, not during the playback of the recorder when the shooting gallery effect actually occurs, but rather at the time of recording. In essence, the invention teaches, in a recording system of the type described, the line averaging of color information, prior to recording such information, as a vehicle for reducing the amplitude and visual effect of color information which will bleed into the playback luminance channel.

The invention will be further described with reference to the figures, wherein:

FIG. 1 is a block diagram including an off-the-air video recorder employing interleaved luminance and chroma signal information for band compression purposes, and embodying the concept of copending Application Ser. No. 605,101 directed to the cleaning of chroma prior to chroma down-conversion;

FIG. 1A is a block diagram of a comb filter useful in apparatus incorporating the invention;

FIG. 2 is a block diagram illustrating a circuit adapted for inclusion in the apparatus of FIG. 1 in order to practice the invention; and FIGS. 3 through 6 are diagrams useful in teaching the concept inherent in the invention.

Figure 6:
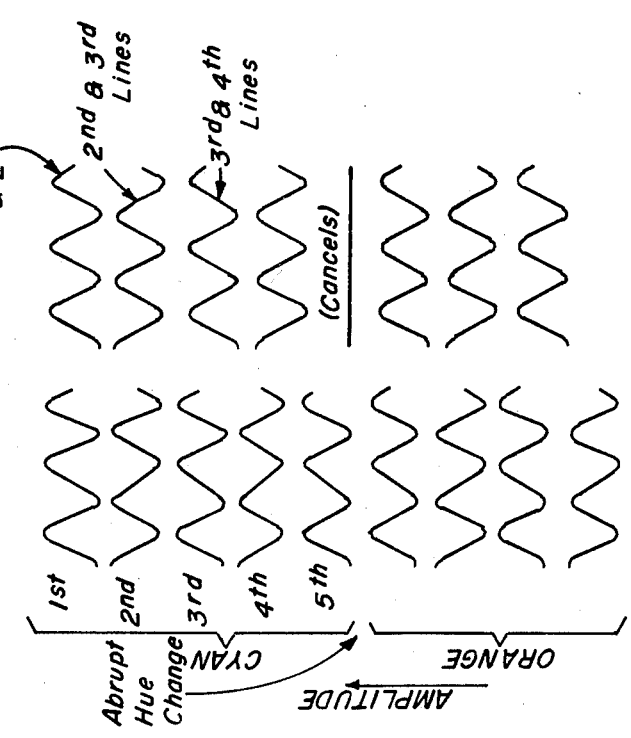

Referring to FIG. 1, the apparatus of copending Application Ser. No. 605,101 embodies a video tape recorder 10 (VTR) that is adapted to be connected to a television antenna 14 and to the input terminals of a television receiver 16 which, in this case, is a color set. While not so indicated, the VTR would conventionally be provided with switching so that record-while-viewing (either the same or different television channels) or play-only modes culd be practiced by the VTR user. Magnetic tape 18, constituting the recording medium, conventionally separates the RECORD side 20 of the VTR from the recorder PLAY side 22 and, whether the same magnetic head, or heads, is, or are, used for record and playback is of no consequence as far as the invention is concerned. Accordingly, two closely-spaced arrows 24, 26 are indicated to symbolize the flow of signal information to and from the tape 18 during, respectively, recording and playback.

The RECORD side 20 of the VTR includes a circuit 28 for detecting the baseband NTSC signal of a selected television channel. As such, the circuit 28 includes a channel selector (tuner) and respective circuits for separating the video and audio parts of the NTSC signal. Since audio signal processing is an aside as far as the invention is concerned, no further reference to audio signal processing is made herein.

Before proceeding further, however, it is to be realized that the invention is practiceable with any NTSC-type signal, not merely with the standard NTSC signal employed in the United States. Thus, any baseband television signal employing a chroma carrier that is an odd multiple of half the line scan rate may be recorded while practicing the invention. For ease of description, it will be assumed that the detected baseband signal is the standard NTSC signal:

The output video signal of the baseband signal detector 28, which signal may, for example, correspond to any of the VHF or UHF television channels, is comprised of a luminance signal portion L and a chroma signal portion C, the chroma signal portion being on a subcarrier of 3.58 MHz that is so selected that the chroma sidebands interleave with the portion of the luminance spectrum in which the luminance power is relatively slight. The chroma signal information, at a center frequency of 3.58 MHz, is culled from the baseband signal by use of a highpass filter 30; combed by a filter 31 to remove high frequency luminance interleaved with the chroma signal information, and then down-converted so as to have frequencies centered at 1.5 MHz ($\pm$ 0.5 MHz), the down-conversion being by use of 5.08 MHz oscillator 32 whose output is mixed (34) with the 3.58 MHz color subcarrier to produce a difference frequency centered at 1.5 MHz ($\pm$0.5 MHz). The chroma difference frequencies are then bandpassed (36) for recombining (summer 38) with the luminance signal L. Because the sidebands of the 3.58 MHz chroma subcarrier interleave with the luminance signal components, so too do the sidebands of the down-converted chroma subcarrier.

The output of the summer 38 is applied via record electronics 40 and signal path 24 to, and directly recorded on, magnetic tape 18, which may be transported past record/play heads in any known way. The record electronics 40 may provide, for example, high frequency pre-emphasis, and high frequency bias for linearizing the direct recording.

As indicated at the output of the summer 38, down-converted chroma (C') is interleaved with the midpart of the luminance spectrum (L'), the point here being that from about 3 MHz and above, either or both the RECORD side 20 and the PLAY side 22 (see the above reference to television receiver manufacturers) is bandedge limited. Such "low passing" of the luminance information L' can either be by use of filters, or by design of any of several components in the record-play signal channel. (The dotted portion of the spectrum appearing at the output of the summer 38 represents information which is effectively filtered out by the record/play signal processing; and the indicated 2.5 MHz bandedge for luminance L' is a presently preferred upper frequency which permits a head-to-tape writing speed of 90 ips.)

During playback, the recorded signal information is processed by playback electronics 42, which may include signal equalizing and de-emphasizing circuits; and then applied to a filter 44. The filter 44, with a filter circuit 45 like the circuit 31, produces the chroma output C' which, when subtracted (47) from the filter 44 input results in the production of the luminance output L'. (A variation 44' of the circuit 44 is depicted in FIG. 1A). The two outputs, C' and L', are then processed as follows: The chroma output C' is up-converted by means of a 5.08 MHz oscillator 46 and mixer 48. The up-converted chroma difference frequencies (3.58 ± 0.5 MHz) are bandpassed (50) and then recombined (summer 52) with the combed-out luminance L' to produce a modified NTSC baseband signal, i.e., a signal in which the chroma and luminance sidebands no longer partly interleave, owing to the bandlimiting which stripped the high frequency luminance in the region of 3.58 MHz. Such modified NTSC signal is then employed to modulate (54) a carrier (oscillator 56) corresponding to a vacant channel of the television receiver 16.

With the output of the modulator 54 applied to the input terminals of the television receiver 16, and with the television receiver turned on, and its channel selector set to the above-noted vacant channel, visual information corresponding to the modulator output appears on the face of the television receiver 16.

As indicated earlier, in building up the system of FIG. 1, certain motion along horizontal edges (giving it the general appearance of a shooting gallery) occurred in the played-back picture displayed on the television receiver 16. By analysis, it was determined that the cause of such horizontal edge motion was the bleeding of the chroma output C' of the playback filter 44 into the filter 44 output channel containing luminance L'. And, as indicated above, the solution to the problem was the inclusion of a circuit 71 (FIG. 2), on the record side of the FIG. 1 recorder, which served to reduce the effects of vertical chroma variation within the scene displayed on the television receiver 16. The rationale for reducing chroma vertical resolution to avoid the shooting gallery effect, and how and why the shooting gallery effect should occur in the first place, may be found in the following analysis:

Consider the chroma input to the filter 44, for each of four successive played-back scan lines, each being representative of one color, cyan. See FIG. 3A. Such an input will, when processed by the difference circuit 47, result in complete cancellation of chroma, whereby the luminance outputs L' of the difference circuit 47 is uncontaminated by chroma. FIG. 3B. However, examine what happens when there is a hue change in two successive played-back scan lines e.g., a change from cyan to orange. See FIG. 4A. As indicated, successive lines of different chroma cause incomplete chroma cancellation by the difference circuit 47 and, attendantly, a signal $C_x$, FIG. 4B, bleeds into the luminance channel. In other words, so long as the chroma information has line-by-line redundancy, i.e., does not change vertically, the circuit 44 will work efficiently to separate the luminance L' and chroma C' from each other. In the usual case, however, perfect line-by-line redundancy of chroma is not the case; and so the invention, as will appear below, works to reduce the amplitude and visual effect of the chroma "bleed signal $C_x$," by effectively spreading the vertical hue change over several scan lines, i.e., by line averaging the chroma information.

It is known that a comb filter will halve the vertical resolution of the information content of the line scan signals which it processes. Thus, in practicing the invention, one or more comb filters, like the circuit 31, FIG. 1, may be employed as the chroma vertical resolution reducer 71 depicted in FIG. 2. Use of a comb filter for reducing vertical chroma resolution is not, in principle, akin to the comb filtering necessary to separate interleaved luminance and chroma information. That this is so evidenced by the fact that the chroma vertical resolution reduce 71 (i.e., comb filter) may be inserted as replacement for the leads $x$–$y$, $x'$–$y'$, $x''$–$y''$, or even $x'''$–$y'''$, in the record chroma channel of the FIG. 1 apparatus, the leads $x'$–$y'$ and $x''$–$y''$ being involved in the processing of chroma which is virtually devoid of luminance information.

Reference should now be had to FIGS. 5 and 6 which show, respectively, the signal processing of changing chroma information when the invention is not, and is, employed: With reference to the system of FIG. 1, when not practicing the invention (FIG. 5), it should be noted that two lines of in-phase chroma bleed into the playback luminance channel as a result of a scene chroma change. Because of their in-phase relationship, the visual effect of the two lines of chroma into the luminance channel is especially apparent, the ruinous of a good playback display. By modifying the system of FIG. 1 to include the chroma vertical resolution reducer 71 as indicated by the invention, however, note what happens. FIG. 6. As a result of a scene chroma change, three lines of reduced-amplitude chroma (as opposed to only two bleeding lines when not practicing the invention) to bleed into the playback luminance channel, but successive pairs of the three bleeding lines are 180° out of phase; and thus their visual effect is minimal.

The invention has been described in detail with particular reference to preferred embodiments thereof, but it will be understood that variations and modifications can be effected within the spirit and scope of the invention: Though not shown, it is obvious that equalizing delays will be included in the circuits which have been described to maintain proper phase coherence between luminance and chroma, and between high and low frequency luminance in both record and playback circuits.

What is claimed is:

1. In record apparatus for use with a video tape recorder for off-the-air recording of a television signal, the baseband signal part of which has chroma signal information frequency interleaved with part but not all of the luminance signal information, said apparatus being adapted for use with playback apparatus having means for combing apart interleaved chroma and luminance signal information, and comprised of:
  a. means for receiving said television signal and for detecting said baseband signal;
  b. means responsive to said baseband signal for isolating that part of the spectrum of said baseband signal containing chroma signal information interleaved with luminance signal information;
  c. means for selectively removing luminance signal information from the isolated spectrum part, thereby to provide a modified isolated spectrum part containing substantially only chroma signal information;
  d. means for down-converting the chroma signal information of said modified isolated spectrum part and for combining and interleaving said down-converted chroma signal information with luminance signal information corresponding to frequencies below those contained in the isolated spectrum part; and
  e. means for recording the down-converted chroma signal information and the luminance signal information with which it interleaves on magnetic tape, the improvement:
    1. wherein said means for isolating, said means for removing luminance signal information, and said means for down-converting and combining and interleaving define a chroma signal processing channel, and
    2. wherein said channel includes therein means for reducing the vertical resolution of the chroma signal information that it processes, said means for reducing chroma vertical resolution being adapted to do so to reduce the bleeding of chroma signal information into the playback luminance signal channel during the combing apart of the shifted chroma signal information and said luminance signal information, thereby to mitigate horizontally travelling video artifacts.

2. The apparatus of claim 1 wherein said means for reducing the vertical resolution of signal information is a comb filter.

3. The apparatus of claim 1 wherein both said means for removing luminance signal information and said means for reducing the vertical resolution of signal information are comb filters.

4. The apparatus of claim 1 further including:
  a. means cooperative with magnetic tape for playing back recorded interleaved down-converted chroma signal information and luminance signal information;
  b. means for separating played-back luminance signal information and said down-converted chroma signal information;
  c. means for up-converting said chroma signal information to a reference frequency; and
  d. means for combining said up-converted chroma signal information with said separated luminance signal information so that said luminance signal information and said chroma signal information occupy different spectrum parts.

5. The apparatus of claim 4,
  a. wherein said means for separating said luminance signal information and said down-converted chroma signal information is a comb filter; and
  b. wherein said apparatus includes modulator means for placing said combined up-converted chroma signal information and said separated luminance signal information on a television band carrier frequency.

6. Apparatus for recording an NTSC-type television signal on a recording medium, said apparatus being adapted for use with playback apparatus having means for combing apart interleaved chroma and luminance signal information, and comprising:
  a. means for isolating that part of the signal spectrum containing interleaved chroma and luminance signal information;
  b. comb filter means for removing luminance signal information from said isolated signal spectrum part to produce an isolated signal spectrum part containing substantially only chroma signal information;
  c. means in addition to said comb filter for reducing the vertical resolution of the chroma signal information;
  d. means for shifting in frequency said isolated signal spectrum part containing substantially only chroma signal information so that it overlays and interleaves with, spectrum-wise, that part of the signal spectrum of the NTSC-type signal containing only luminance signal information; and
  e. means for simultaneously applying said shifted chroma signal information, and the luminance signal information corresponding to that part of the signal spectrum of the NTSC-type signal containing only luminance signal information, to a common recording track of said recording medium, said means for reducing chroma vertical resolution being adapted to do so to reduce the bleeding of chroma signal information into the playback luminance signal channel during the combing apart of the shifted chroma signal information and said luminance signal information, thereby to mitigate horizontally travelling video artifacts.

7. The apparatus of claim 6 wherein said means for reducing the vertical resolution of chroma signal information is a comb filter.

8. The apparatus of claim 7, including:
  a. means cooperative with magnetic tape for producing playback signals corresponding to the signal spectrum including said shifted chroma signal information and the luminance part of the signal spectrum of the NTSC-type signal with which said shifted chroma signal information interleaves;
  b. means for separating said interleaved playback signal information into, respectively, a chroma signal spectrum part and a luminance signal spectrum part; and
  c. means for shifting, spectrum-wise, the separated playback chroma signal spectrum part to its reference location within the spectrum of the NTSC-type signal, whereby the shifted chroma signal spectrum and said playback luminance signal spectrum part together form a modified NTSC-type signal.

9. The apparatus of claim 8 wherein said means (c) and (d) together comprise a plurality of comb filters connected in tandem.

10. A video tape recorder for making a direct recording within a recording medium of chroma and luminance signal information contained within an NTSC-type signal, said chroma signal information being modulated on a subcarrier having a predetermined reference frequency with respect to the spectrum of said NTSC-type signal, comprising:

a. means for receiving, off the air, a television signal and for producing therefrom said NTSC-type signal;

b. means responsive to said NTSC-type signal for producing that band of signal frequencies which correspond to chroma and luminance signal information interleaved with each other;

c. means for removing luminance signal information from said band of signal frequencies containing chroma and luminance signal information, thereby to produce a band of signal frequencies corresponding to the chroma signal information that is substantially devoid of luminance signal information;

d. means for reducing the vertical resolution of said chroma signal information;

e. means for down-converging said chroma signal information substantially devoid of luminance signal information so that the center frequency for said down-converted chroma signal information falls within that part of the NTSC-type signal spectrum which contains virtually no chroma signal information;

f. means cooperative with said recording medium for simultaneously directly recording within a common track of said recording medium said down-converted chroma signal information and that part of the NTSC-type signal spectrum which contains virtually no chroma information;

g. means cooperative with said recording medium for playing back said simultaneously recorded chroma and luminance signal information;

h. means for separating said played-back chroma and luminance signal information into respective bands of signal frequencies;

i. means for up-converting that band of signal frequencies corresponding to said separated chroma signal information so that the center frequency of said up-converted chroma signal information is said predetermined reference frequency; and j. means for combining the up-converted chroma signal information with the played-back luminance signal information which is separated from said chroma signal information, thereby to form a modified NTSC-type signal for processing through a television receiver, said means for reducing chroma vertical resolution being adapted to do so to reduce the bleeding of chroma signal information into the playback luminance signal channel during the combing apart of the shifted chroma signal information and said luminance signal information thereby to mitigate horizontally travelling video artifacts.

* * * * *